(12) United States Patent
Gulick

(10) Patent No.: US 6,651,128 B1
(45) Date of Patent: Nov. 18, 2003

(54) SYSTEMS AND METHODS FOR ARBITRATING BETWEEN ASYNCHRONOUS AND ISOCHRONOUS DATA FOR ACCESS TO DATA TRANSPORT RESOURCES

(75) Inventor: Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/501,889

(22) Filed: Feb. 10, 2000

(51) Int. Cl.[7] .............................................. G06F 13/00
(52) U.S. Cl. .............................. 710/309; 710/1; 710/4; 710/7; 710/33; 710/36; 710/52; 710/107; 710/112; 710/113; 710/310; 710/241; 710/242
(58) Field of Search .............................. 710/1, 4, 7, 33, 710/36, 52, 107, 112, 113, 309, 310, 241, 242

(56) References Cited

U.S. PATENT DOCUMENTS

| | | | | |
|---|---|---|---|---|
| 5,745,732 A | * | 4/1998 | Cherukuri et al. | 711/168 |
| 5,761,455 A | * | 6/1998 | King et al. | 710/316 |
| 6,148,357 A | | 11/2000 | Gulick et al. | |
| 6,199,132 B1 | | 3/2001 | Hewitt et al. | |
| 6,286,068 B1 | * | 9/2001 | Arimilli et al. | 710/107 |
| 6,286,090 B1 | * | 9/2001 | Steely, Jr. et al. | 711/207 |

* cited by examiner

Primary Examiner—Jeffrey Gaffin
Assistant Examiner—Mohammad O. Farooq
(74) Attorney, Agent, or Firm—Meyertons Hood Kivlin Kowert & Goetzel, P.C.; B. Noël Kivlin

(57) ABSTRACT

Several different systems and methods are described involving arbitration between asynchronous and isochronous data for access to a data transport resource (e.g., a bus or a memory controller). A first embodiment of a system (e.g., a computer system or a communication system) includes an arbiter coupled to the data transport resource, an asynchronous queue for storing asynchronous data, and an isochronous queue for storing isochronous data. The isochronous queue has a data level range divided into multiple portions. A number of memory locations within the isochronous queue may define the data level range of the isochronous queue. The arbiter arbitrates between the asynchronous queue and the isochronous queue for access to the data transport resource dependent upon the portion of the data level range in which a level of data resides within the isochronous queue. The level of data within the isochronous queue may be a number of memory locations between a write pointer and a read pointer. The arbiter may include a set of arbitration rules, wherein each arbitration rule states conditions used to determine whether data is provided from the isochronous queue or the asynchronous queue. The arbiter may arbitrate between the asynchronous queue and the isochronous queue for access to the data transport resource by: (i) selecting an arbitration rule from the set of arbitration rules dependent upon the portion of the data level range in which the level of data resides within the isochronous queue, and (ii) applying the rule.

23 Claims, 6 Drawing Sheets

SYSTEMS AND METHODS FOR ARBITRATING BETWEEN ASYNCHRONOUS AND ISOCHRONOUS DATA FOR ACCESS TO DATA TRANSPORT RESOURCES

BACKGROUND OF THE INVENTION

1. Field of the Invention

This invention is related to electronic systems which transfer data and, more particularly, to electronic systems used to convey both asynchronous and isochronous data.

2. Description of the Related Art

A typical modem personal computer system includes a central processing unit (CPU) coupled to a main memory and a local bus (e.g., a peripheral component interconnect or PCI bus) through bridge circuitry. The bridge circuitry functions as an interface between the CPU and the main memory, and may include a memory controller. The bridge circuitry also functions as an interface between the CPU and various peripheral and input/output (I/O) devices coupled to the local bus.

Most data exchanges within a personal computer system occur intermittently rather than in a steady stream. Such "asynchronous" data transmissions include CPU accesses to main memory and data transmissions between a hard drive coupled to the local bus and main memory. Asynchronous data transmissions are separated by idle periods of arbitrary length. On the other hand, multimedia data such as video and audio data must be presented in a continuous manner, thus the transmission of multimedia data is time dependent or "isochronous". Such isochronous data transmissions tend to occur at substantially regular time intervals and require a certain minimum data rate to support continuous presentation (i.e., "isochrony"). Modern personal computer systems support both asynchronous and isochronous data transfers.

Both asynchronous and isochronous data are conveyed along substantially the same transmission paths within the computer system, and compete for the same transmission resources (e.g., buses). As mentioned above, asynchronous data transmissions include CPU accesses to main memory. Performance of the personal computer system is thus highest when asynchronous data is conveyed as quickly as possible through the system.

It is noted that in most cases, the data bandwidth of isochronous data is much less than the data bandwidths of transmission resources such as buses used to convey both asynchronous and isochronous data. Also, there are typically sufficient idle times between asynchronous data transfers to support isochronous data transfers.

It would thus be desirable to have a system for arbitrating between asynchronous and isochronous data for access to transmission resources which maximizes a transfer rate of asynchronous data. When such an arbitration system is incorporated within a personal computer, the performance of the personal computer system is maximized.

SUMMARY OF THE INVENTION

Several different systems and methods are described involving arbitration between asynchronous and isochronous data for access to a data transport resource (e.g., a bus or a memory controller). A first embodiment of a system (e.g., a computer system or a communication system) includes an arbiter coupled to the data transport resource, an asynchronous queue for storing asynchronous data, and an isochronous queue for storing isochronous data. The isochronous queue has a data level range divided into multiple portions. The arbiter arbitrates between the asynchronous queue and the isochronous queue for access to the data transport resource dependent upon the portion of the data level range in which a level of data resides within the isochronous queue.

For example, the isochronous queue may include multiple memory locations operated in a first-in-first-out (FIFO) manner. In this case, the number of memory locations within the isochronous queue defines the data level range of the isochronous queue. The isochronous queue may also include a write pointer which indicates the next available memory location for storing isochronous data, and a read pointer which indicates the next memory location containing unread isochronous data. The level of data within the isochronous queue may be the number of memory locations between the write pointer and the read pointer.

The arbiter may include a set of arbitration rules, wherein each arbitration rule states conditions used to determine whether data is provided from the isochronous queue or the asynchronous queue. The arbiter may arbitrate between the asynchronous queue and the isochronous queue for access to the data transport resource by: (i) selecting an arbitration rule from the set of arbitration rules dependent upon the portion of the data level range in which the level of data resides within the isochronous queue, and (ii) applying the rule.

The data level range of the isochronous queue may extend between a maximum value and a minimum value. An upper portion of the data level range may include the maximum value, and a lower portion of the data level range may include the minimum value. Other portions of the data level range may exist between the upper and lower portions.

When the system is a computer system, performance of the computer system is highest when asynchronous data is conveyed as quickly as possible through the computer system. The level of data within the isochronous queue is relatively low when the level of data resides in the lower portion of the data level range. The arbiter may select a first rule from the set of arbitration rules when the level of data within the isochronous queue is relatively low. In order to convey asynchronous data as quickly as possible through the computer system, the asynchronous queue may receive priority over the isochronous queue for access to the data transport resource under the first rule.

The level of data within the isochronous queue is relatively high when the level of data resides in the upper portion of the data level range. The arbiter may select a second rule from the set of arbitration rules when the level of data within the isochronous queue is relatively high. The isochronous queue may receive increased consideration for access to the data transport resource under the second rule than under the first rule in order to avoid an overflow condition within the isochronous queue.

The arbiter may receive a signal indicating a need for isochronous data, and may allow the isochronous queue access to the data transport resource in response to the signal in order to maintain isochrony.

The asynchronous queue may receive asynchronous data and provide the asynchronous data in an order received. The asynchronous data may include memory read and write commands and associated data values. The isochronous queue may receive isochronous data and provide the isochronous data in an order received. The isochronous data may include video data or audio data.

A first method for providing data, which may be embodied within the first system described above, includes dividing the data level range of the isochronous queue into multiple portions. A single one of a set of arbitration rules is associated with each portion of the data level range. As described above, each arbitration rule states conditions used to determine whether data is provided from the isochronous queue or an asynchronous queue. A different arbitration rule may be associated with each portion of the data level range. Alternately, a given arbitration rules may be associated with more than one of the portions of the data level range. The level of data within the isochronous queue is determined, and a target portion of the data level range in which the level of data resides is determined. The arbitration rule associated with the target portion of the data level range is applied in order to provide data from either the isochronous queue or the asynchronous queue.

A second embodiment of a system (e.g., a computer system or a communication system) includes an arbiter coupled to the data transport resource, multiple asynchronous queues for storing asynchronous data, and multiple isochronous queues for storing isochronous data. Each isochronous queue includes a data level range divided into multiple portions as described above. The arbiter arbitrates between the asynchronous queues and the isochronous queues for access to the data transport resource dependent upon the portion of the data level range in which a level of data resides within of each of the isochronous queues.

The asynchronous queues may be grouped to form an asynchronous group, and the isochronous queues may be grouped to form an isochronous group. The arbiter may include a set of arbitration rules, wherein each arbitration rule states conditions used to determine whether data is provided from the isochronous group or the asynchronous group. The arbiter may arbitrate between the asynchronous group and the isochronous group for access to the data transport resource by: (i) selecting an arbitration rule from the set of arbitration rules dependent upon the portion of the data level range of each of the isochronous queues in which the level of data resides, and (ii) applying the rule.

The arbiter may receive one or more signals indicating a need for isochronous data from respective isochronous queues as described above. In response to a given signal, the arbiter may allow the respective isochronous queue access to the data transport resource in order to maintain isochrony.

A second method for providing data, which may be embodied within the second system, includes grouping multiple asynchronous queues to form an asynchronous group, and grouping multiple isochronous queues to form an isochronous group as described above. The levels of data within the isochronous queues are determined, and a target group is selected from among the asynchronous and isochronous groups dependent upon the levels of data within the isochronous queues. A data queue is selected within the target group, and data is provided from the selected data queue.

In order to facilitate arbitration, a data level range of each of the isochronous queues may be divided into multiple portions, and a single one of a set of arbitration rules may be associated with each possible combination of the portions of the data level ranges of the isochronous queues. Each arbitration rule states conditions used to determine whether data is provided from the asynchronous group or the isochronous group. A different arbitration rule may be associated with each possible combination of the portions of the data level ranges of the isochronous queues. Alternately, an arbitration rule may be associated with more than one of the possible combinations of the portions of the data level ranges of the isochronous queues. The step of selecting a target group may include: (i) determining a target portion of the data level range of each isochronous queue in which the level of data resides, and (ii) applying the arbitration rule associated with the combination of the portions of the data level ranges including the target portions of the data level ranges in order to select a target group from among the asynchronous and isochronous groups.

BRIEF DESCRIPTION OF THE DRAWINGS

Other objects and advantages of the invention will become apparent upon reading the following detailed description and upon.reference to the accompanying drawings in which.

Figure 1:
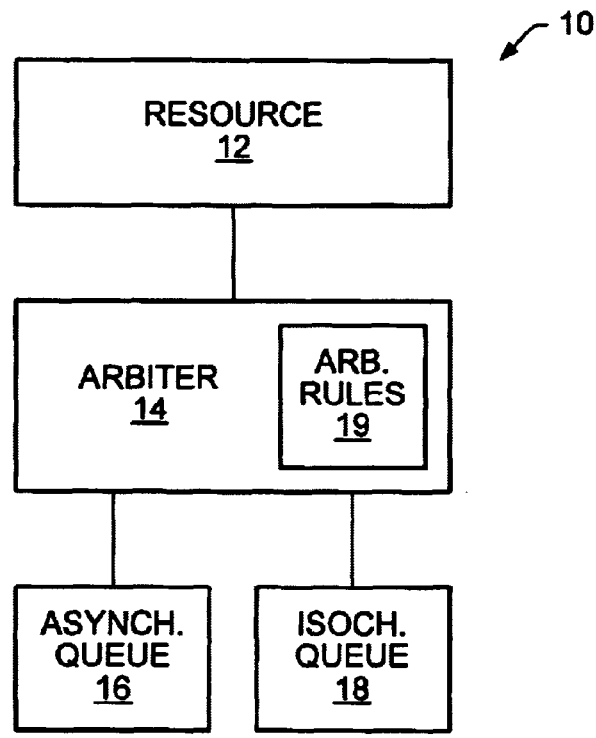
FIG. 1 is a block diagram of one embodiment of a system including an arbiter coupled to an asynchronous queue, an isochronous queue, and a data transport resource.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of one embodiment of a system 10 including an arbiter 14 coupled to an asynchronous queue 16, an isochronous queue 18, and a data transport resource 12. Asynchronous queue 16 is used to store asynchronous data, and isochronous queue is used to store isochronous data. Arbiter 14 arbitrates between asynchronous data in asynchronous queue 16 and isochronous data in isochronous queue 18 for access to data transport resource 12 dependent upon a level of data within isochronous queue 18. System 10 may be, for example, a computer system or a communication system. Resource 12 may be, for example, a bus or a memory controller.

As indicated in FIG. 1, arbiter 14 includes a set of arbitration rules 19. Each arbitration rule within the set of arbitration rules 19 states conditions used to determine whether data is provided from asynchronous queue 16 or isochronous queue 18. As described in detail below, arbiter 14 arbitrates between asynchronous queue 16 and isochronous queue 18 for access to resource 12 by: (i) selecting an arbitration rule from the set of arbitration rules 19 dependent upon a portion of a data level range in which a level of data resides within isochronous queue 18, and (ii) applying the rule.

When system 10 is a computer system, asynchronous data includes read and write commands generated by a central processing unit (CPU), and data values associated with the commands. Performance of the computer system is highest when asynchronous data is conveyed as quickly as possible through the computer system. As depicted in FIG. 1, asynchronous and isochronous data compete for limited data transport resources (e.g., resource 12) within the computer system. The asynchronous data may be conveyed as quickly as possible through the computer system, and the performance of the computer system maximized, by limiting conveyance of the competing isochronous data to a minimum rate sufficient to just maintain isochrony in an isochronous communication link including isochronous queue 18.

Figure 2:
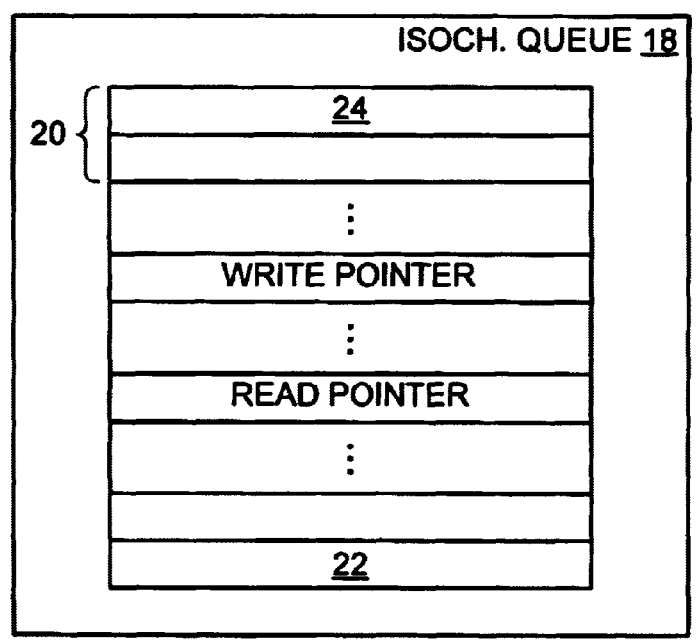
FIG. 2 is a diagram of one embodiment of the isochronous queue of FIG. 1 wherein the isochronous queue includes a number of memory locations operated in a first-in-first-out (FIFO) manner.

FIG. 2 is a diagram of one embodiment of isochronous queue 18 wherein isochronous queue 18 includes a number of memory locations 20 operated in a first-in-first-out (FIFO) manner. Isochronous data is stored within isochronous queue 18 and provided by isochronous queue 18 in the order in which the isochronous data is received (i.e., chronological order). Isochronous queue 18 includes a write pointer which indicates the next available memory location for storing isochronous data and a read pointer which indicates the next memory location containing unread isochronous data. A level of data within isochronous queue 18 may be expressed as the number of memory locations 20 between the write pointer and the read pointer.

Figure 3:
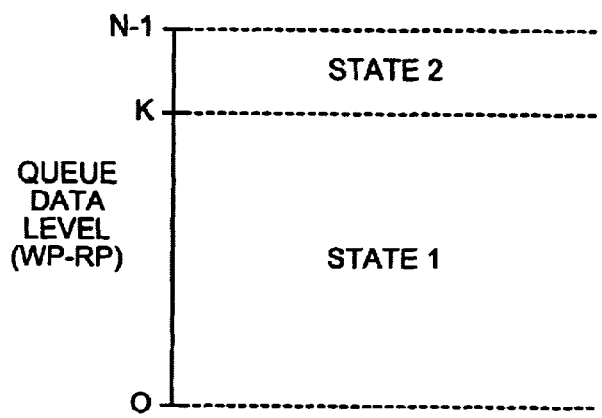
FIG. 3 is a diagram illustrating a first exemplary relationship between a level of data within the isochronous queue and states assigned to the isochronous queue.
Figure 4:
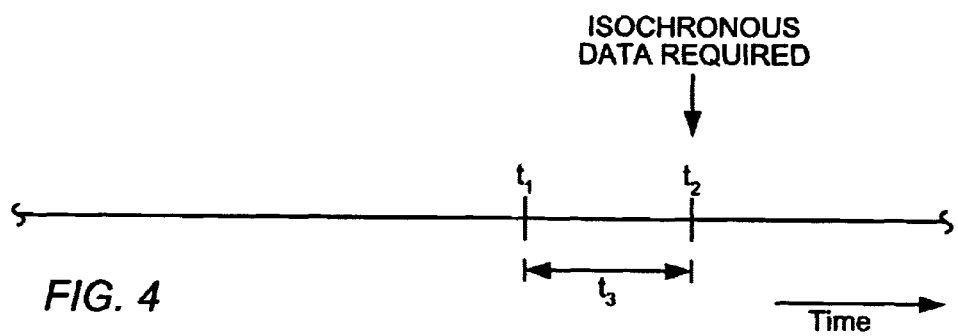
FIG. 4 is a chart illustrating the time dependency of isochronous access to the resource of FIG. 1.

Isochronous queue 18 may be assigned one of various states dependent upon the level of data within isochronous queue 18. FIGS. 3 and 4 illustrate exemplary relationships between the level of data within isochronous queue 18 and a state assigned to isochronous queue 18. As will be described in more detail below, arbiter 14 may arbitrate between asynchronous data in asynchronous queue 16 and isochronous data in isochronous queue 18 for access to resource 12 dependent upon the state assigned to isochronous queue 18.

In FIGS. 3 and 4, N is the number of memory locations in isochronous queue 18. A bottom memory location 22 (FIG. 2) is assigned the number 1, and the memory locations of isochronous queue 18 are numbered consecutively from the bottom memory location 22 to a top memory location 24. Subtracting the number assigned to the memory location indicated by the read pointer (RP) from the number assigned to the memory location indicated by the write pointer (WP) yields the number of memory locations between the write pointer and the read pointer (i.e., the level of data within isochronous queue 18).

FIG. 3 is a diagram illustrating a first exemplary relationship between the level of data within isochronous queue 18 and states assigned to isochronous queue 18. In FIG. 3, if the queue data level is between 0 and K, isochronous queue 18 is in a state 1. On the other hand, if the queue data level is greater than K and less than or equal to (N−1), isochronous queue 18 is in a state 2. The value of K may be, for example, (3N/4), (N−2), etc.

In one embodiment of arbiter 14, a different arbitration rule is associated with each of the possible states of isochronous queue 18. Arbiter 14 arbitrates between asynchronous data in asynchronous queue 16 and isochronous data in isochronous queue 18 for access to resource 12 by applying the rule associated with the current state of isochronous queue 18.

For example, referring to FIG. 3, an arbitration rule 1 may be associated with state 1 and an arbitration rule 2 may be associated with state 2. Rule 1 may state that asynchronous data in asynchronous queue 16 has exclusive priority over the isochronous data in isochronous queue 18 unless isochrony is in jeopardy. In other words, as long as the data level in isochronous queue 18 is less than or equal to K and isochronous data is not required to maintain isochrony, asynchronous data in asynchronous queue 16 is always granted access to resource 12.

FIG. 4 is a chart illustrating the time dependency of isochronous access to resource 12. In FIG. 4, isochronous data from isochronous queue 18 is required by a receiver at time $t_2$ to maintain isochrony. A time period $t_3$ is required to forward the isochronous data to the receiver such that the data arrives by time $t_2$. If the data level in isochronous queue 18 is less than or equal to K, isochronous queue 18 is in state 1. According to rule 1, asynchronous data in asynchronous queue 16 is granted exclusive access to resource 12 for time $t < t_1$, where time $t_1 = (t_2 - t_3)$. At time $t_1$, isochronous data in isochronous queue 18 is granted access to resource 12 in order to maintain isochrony. When isochrony is no longer in jeopardy following isochronous access to resource 12 at time $t_1$, asynchronous data in asynchronous queue 16 is again granted exclusive access to resource 12 according to rule 1.

Figure 5:
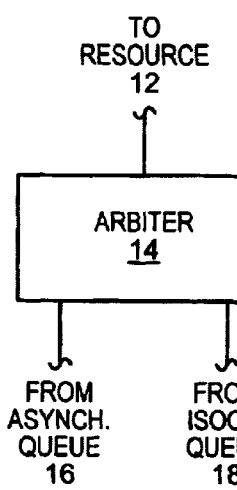
FIG. 5 is a block diagram of one embodiment of the arbiter of FIG. 1 wherein the arbiter receives a signal indicating a need for isochronous data.

FIG. 5 is a block diagram of one embodiment of arbiter 14 of FIG. 1 wherein arbiter 14 receives a NEED ISOCHRONOUS DATA signal generated or asserted by an external source and indicating a need for isochronous data. For example, a presentation device receiving isochronous data via the communication link including isochronous queue 18 may periodically generate or assert the NEED ISOCHRONOUS DATA signal when a level of isochronous data within a queue of the device drops below a threshold level. The threshold level may be selected such that arbiter 14 receives the NEED ISOCHRONOUS DATA signal at time $t_1$ in FIG. 4. According to rule 1, asynchronous data in asynchronous queue 16 may be granted exclusive access to resource 12 when the NEED ISOCHRONOUS DATA signal is not generated or asserted, and isochronous data in isochronous queue 18 may be granted access to resource 12 when the NEED ISOCHRONOUS DATA signal is generated or asserted in order to maintain isochrony.

Rule 2 may state that asynchronous data in asynchronous queue 16 and isochronous data in isochronous queue 18 have equal priority to resource 12. In this case, arbiter 14 may alternate access to resource 12 between asynchronous data in asynchronous queue 16 and isochronous data in isochronous queue 18 as long as isochronous queue 18 remains in state 2.

Figure 6:
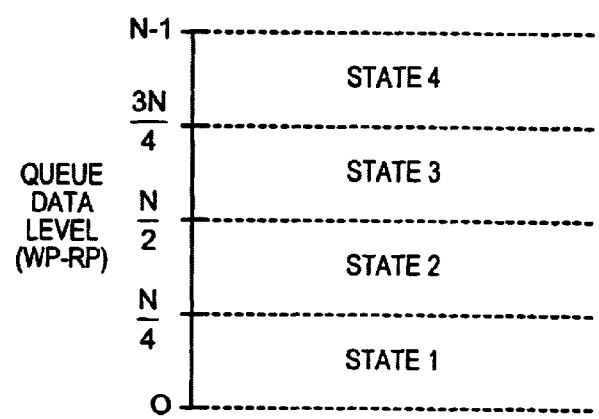
FIG. 6 is a diagram illustrating a second exemplary relationship between the level of data within the isochronous queue and states assigned to the isochronous queue.

FIG. 6 is a diagram illustrating a second exemplary relationship between the level of data within isochronous queue 18 and states assigned to isochronous queue 18. In FIG. 6, if the queue data level is between 0 and (N/4), isochronous queue 18 is in a state 1. If the queue data level is greater than (N/4) and less than or equal to (N/2), isochronous queue 18 is in a state 2. If the queue data level is greater than (N/2) and less than or equal to (3N/4), isochronous queue 18 is in a state 3. If the queue data level is greater than (3N/4) and less than or equal to (N−1), isochronous queue 18 is in a state 4.

A different arbitration rule may be associated with each of the four possible states of isochronous queue 18. Rules 1 and 2 associated with states 1 and 2 may be those described above. An arbitration rule 3 associate with state 3 may state that the priority of isochronous data in isochronous queue 18 is twice the priority of asynchronous data in asynchronous queue 16. In this case, arbiter 14 may grant isochronous data in isochronous queue 18 two accesses to resource 12 for every access granted to asynchronous data in asynchronous queue 16 while isochronous queue 18 is in state 3. An arbitration rule 4 associated with state 4 may state that isochronous data in isochronous queue 18 has exclusive priority over asynchronous data in asynchronous queue 16. Arbiter 14 may thus allow only isochronous data in isochronous queue 18 access to resource 12 while isochronous queue 18 is in state 4.

A single arbitration rule may also be associated with more than one state of isochronous queue 18. In other words, a mapping may be established between the set of arbitration rules 19 and a set of all possible states of isochronous queue 18 in which a given arbitration rule is associated with more than one state of isochronous queue 18. For example, in FIG. 6, rule 1 described above may be associated with states 1, 2, and 3 of isochronous queue 18, and rule 2 may be associated with state 4 of isochronous queue 18. The end result is equivalent to the configuration of FIG. 1 where K =(3N/4).

Figure 7:
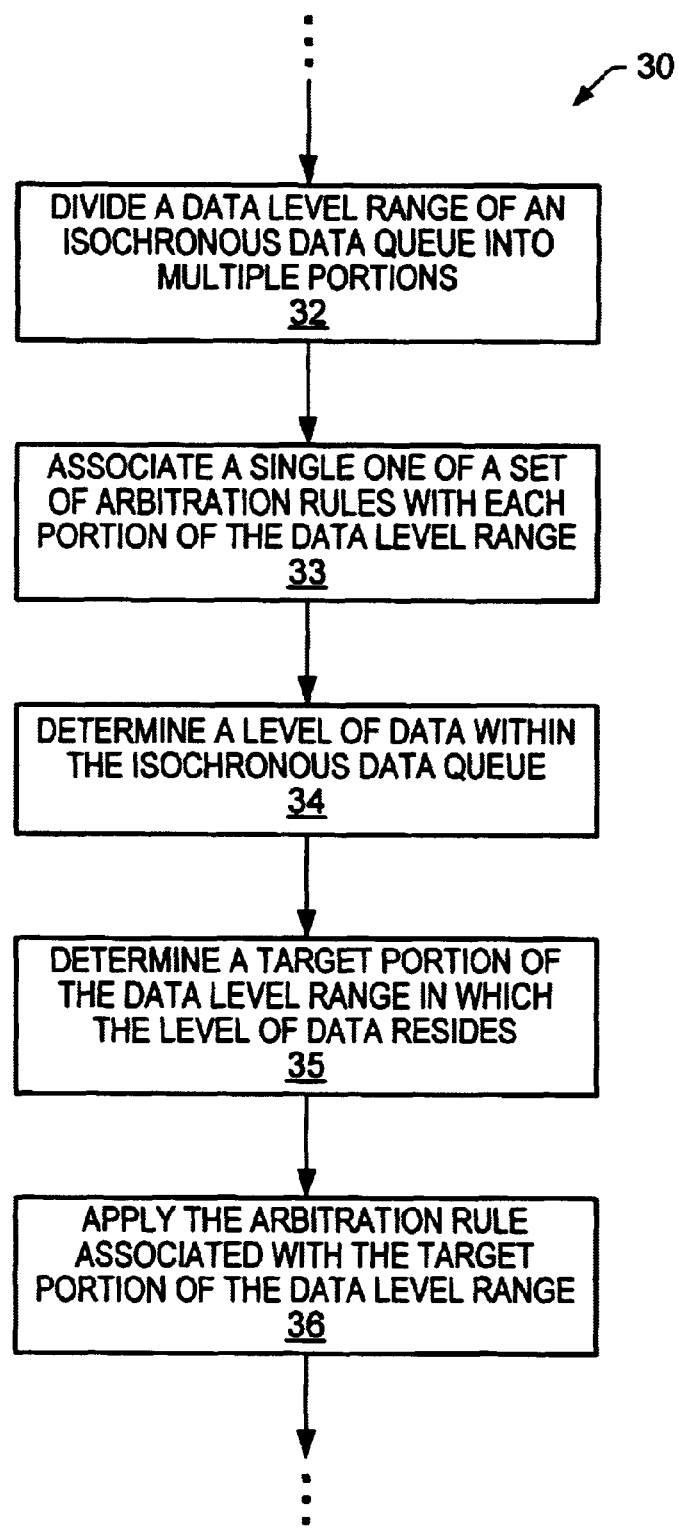
FIG. 7 is a flow chart of one embodiment of a method for providing data which may be embodied within the system of FIG. 1.

FIG. 7 is a flow chart of one embodiment of a method 30 for providing data which encompasses the above concepts and may be embodied within system 10. During a step 32 of method 30, a data level range of an isochronous queue (e.g., isochronous queue 18) is divided into multiple portions. FIGS. 3 and 6 illustrate an association between states of isochronous queue 18 and corresponding portions of the data level range of isochronous queue 18. A single one of a set of arbitration rules (e.g., set of arbitration rules 19) is associated with each portion of the data level range during a step 33. Each arbitration rule states conditions used to determine whether data is provided from the isochronous queue or an asynchronous queue (e.g., asynchronous queue 16) as described above. A different arbitration rule may be associated with each portion of the data level range, or one of the arbitration rules may be associated with more than one of the portions of the data level range as described above.

During a step 34, a level of data within the isochronous queue is determined. A target portion of the data level range within which the level of data resides is determined during a step 35. During a step 36, the arbitration rule associated with the target portion of the data level range is applied in order to provide data from either the isochronous queue or the asynchronous queue.

Figure 8:
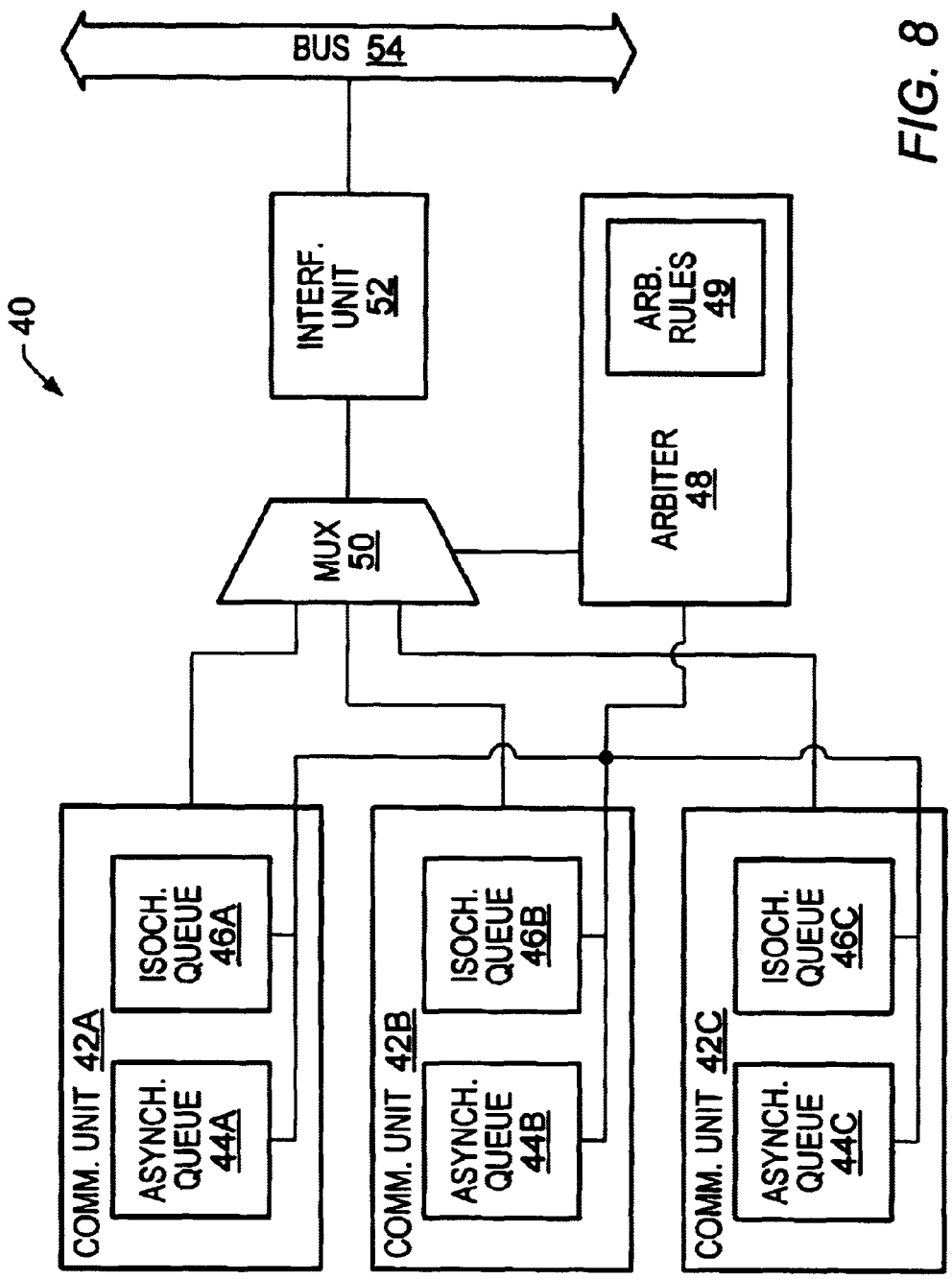
FIG. 8 is a block diagram of one embodiment of a system wherein an arbiter arbitrates between multiple asynchronous queues and multiple isochronous queues for access to a bus.

FIG. 8 is a block diagram of one embodiment of a system 40 wherein an arbiter 48 arbitrates between multiple communication units 42A–42C for access to a bus 54. System 40 may be, for example, a computer system or a communication system. Each communication unit 42A–42C includes a respective asynchronous queue 44A–44C for storing asynchronous data and a respective isochronous queue 46A–46C for storing isochronous data. Arbiter 48 is coupled to the asynchronous queue 44 and the isochronous queue 46 of each communication unit 42, and arbitrates between asynchronous queues 44 and isochronous queues 46 for access to bus 54 dependent upon levels of data within isochronous queues 46 and/or asynchronous queues 44.

Asynchronous queues 44 are grouped to form an asynchronous group, and isochronous queues 46 are grouped to form an isochronous group. As indicated in FIG. 8, arbiter 48 includes a set of arbitration rules 49. Each arbitration rule within the set of arbitration rules 49 states conditions used to determine whether data is provided from the isochronous group or the asynchronous group. As will be described in detail below, arbiter 48 arbitrates between the asynchronous group and the isochronous group for access to bus 54 by: (i) selecting an arbitration rule from the set of arbitration rules 49 dependent upon the portion of the data level range of each of the isochronous queues 46 in which the level of data resides, and (ii) applying the rule. Once arbiter 48 has selected either the asynchronous group or the isochronous group for access to bus 54, arbiter 48 selects a single queue within the selected group for access to bus 54.

Arbiter 48 may receive one or more signals indicating a need for isochronous data from a respective isochronous queue 46 in the manner of FIG. 5. In response to a given signal, arbiter 48 may allow the isochronous group, and the respective isochronous queue 46, access to bus 54 in order to maintain isochrony.

Each communication unit 42 having asynchronous data within the asynchronous queue 44 may provide the asynchronous data to a different input of a multiplexer (mux) 50. Similarly, each communication unit 42 having isochronous data within the isochronous queue 46 may provide the isochronous data to a different input of multiplexer (mux) 50. An output of multiplexer 50 is coupled to bus 54 via an interface unit 52. Interface unit 52 may include, for example, drive circuitry for driving data signals upon bus 54. Arbiter 48 selects one of the asynchronous queues 44 or isochronous queues 46 for access to bus 54 dependent upon the levels of data within asynchronous queues 44 and isochronous queues 46. Arbiter provides control signals to multiplexer 50 which allows the data from the selected asynchronous queue 44 or isochronous queue 46 to be produced at the output of multiplexer 50.

In one embodiment, all of the asynchronous queues 44 are grouped together in a asynchronous group, and all of the isochronous queues 46 are grouped together in a isochronous group as described above. Levels of isochronous data within isochronous queues 46A–46C may be used to assign states to isochronous queues 46A–46C as described above. A mapping is established between the set of arbitration rules 49 and a set of all possible combinations of the states of isochronous queues 46. Arbiter 48 may arbitrate between the asynchronous group and the isochronous group for access to bus 54 by applying the rule associated with the current combination of states of isochronous queues 46. In other words, arbiter 48 may decide whether asynchronous data or isochronous data is driven upon bus 54 by applying an arbitration rule selected from the set of arbitration rules 49 dependent upon the levels of data within isochronous queues 46.

For example, isochronous queues 46 may be assigned one of two states in the configuration of FIG. 3 above. Rule 1 described above may be associated with the combination of states of isochronous queues 46 wherein all three isochronous queues 46 are in state 1. Rule 2 described above may be associated will all other combinations of states of isochronous queues 46 (i.e., wherein any one of the three isochronous queues 46 is in state 2). Arbiter 48 may arbitrate between the asynchronous group of asynchronous queues 44 and the isochronous group of isochronous queues 46 for access to bus 54 by applying either rule 1 or rule 2 dependent upon the current combination of states of isochronous queues 46.

Once arbiter 48 has determined whether to allow the asynchronous group or the isochronous group access to bus 54, arbiter 48 performs a secondary selection process to select a particular queue within the selected group. In the case where arbiter 48 selects the asynchronous group, arbiter 48 may then select the asynchronous queue 44 within the asynchronous group having the highest level of asynchronous data for access to bus 54. It is noted that the levels of asynchronous data within asynchronous queues 44 may be used to assign states to asynchronous queues 44 in the manner described above, and the secondary selection process may be based upon the states assigned to asynchronous queues 44.

As described above, arbiter 48 may select the isochronous group of isochronous queues 46 for access to bus 54 based upon a pending loss of isochrony in an isochronous communication link including a particular isochronous queue 46. In this case, the particular isochronous queue 46 is also the isochronous queue 46 granted access to bus 54.

In the case where arbiter 48 selects the isochronous group for access to bus 54 and no pending loss of isochrony exists, arbiter 48 may then select the isochronous queue 46 within the isochronous group having the highest level of isochronous data for access to bus 54. The secondary selection process may be based upon the states assigned to isochronous queues 46.

It is noted that arbiter 48 may be configured to dynamically change the mapping between the set of arbitration rules 49 and the possible combinations of states of isochronous queues 46 during operation of system 40 in order to improve the performance of system 40.

Figure 9:
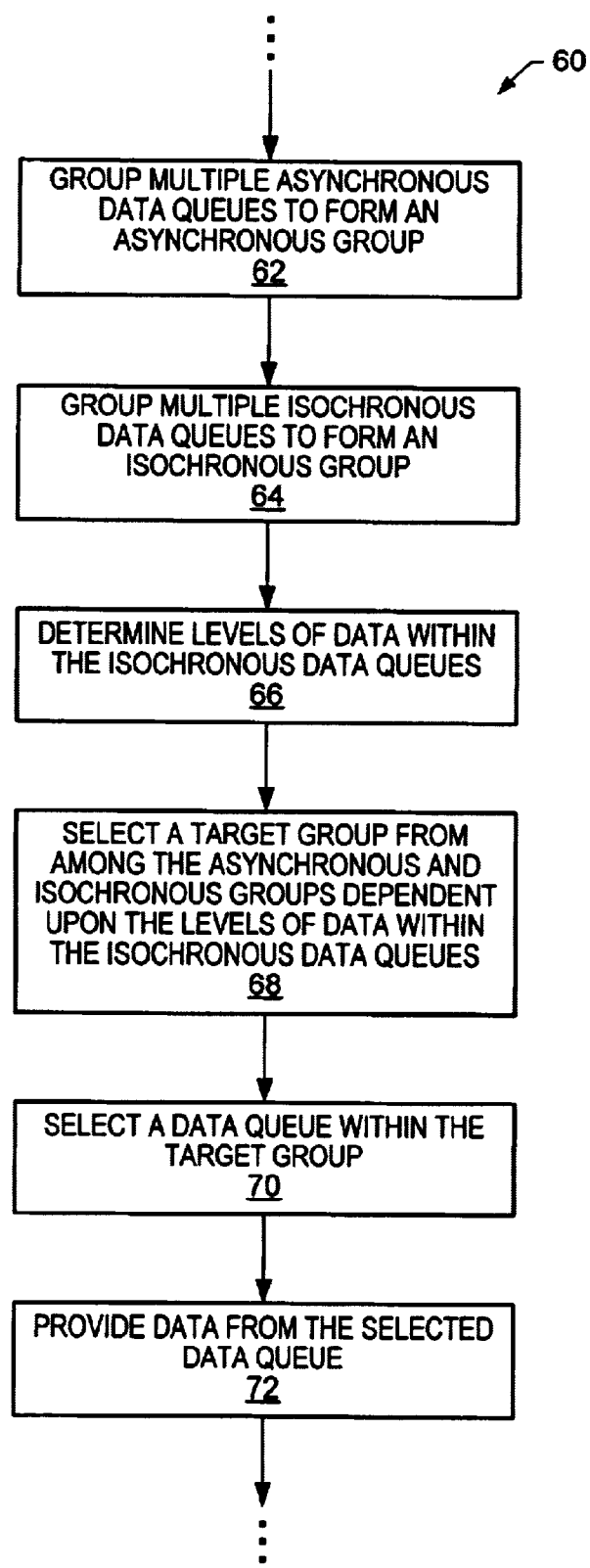
FIG. 9 is a flow chart of one embodiment of a method for providing data which may be embodied within the system of FIG. 8.

FIG. 9 is a flow chart of one embodiment of a method 60 for providing data which may be embodied within system 40. During a step 62 of method 60, multiple asynchronous queues (e.g., asynchronous queues 44) are grouped to form an asynchronous group. Similarly, multiple isochronous queues (e.g., isochronous queues 46) are grouped to form an isochronous group during a step 64. During a step 66, the levels of data within the isochronous queues are determined. A target group is selected from among the asynchronous and isochronous groups dependent upon the levels of data within the isochronous queues during a step 68. During a step 70, a data queue within the target group is selected. Data from the selected data queue is provided during a step 72.

It is noted that a data level range of each of the isochronous queues may be divided into multiple portions, and a single one of a set of arbitration rules (e.g., set of arbitration rules 49) may be associated with each possible combination of the portions of the data level ranges of the isochronous queues as described above. Each arbitration rule states conditions used to determine whether data is provided from the asynchronous group or the isochronous group. A different arbitration rule may be associated with each possible combination of the portions of the data level ranges of the isochronous queues. Alternately, one of the arbitration rules may be associated with more than one of the possible combinations of the portions of the data level ranges of the isochronous queues as described above. Step 68 of method 60 may include: (i) determining a target portion of the data level range of each of the isochronous queues in which the level of data resides, and (ii) applying the arbitration rule associated with the combination of the portions of the data level ranges including the target portions of the data level ranges in order to select a target group from among the asynchronous and isochronous groups.

Figure 10:
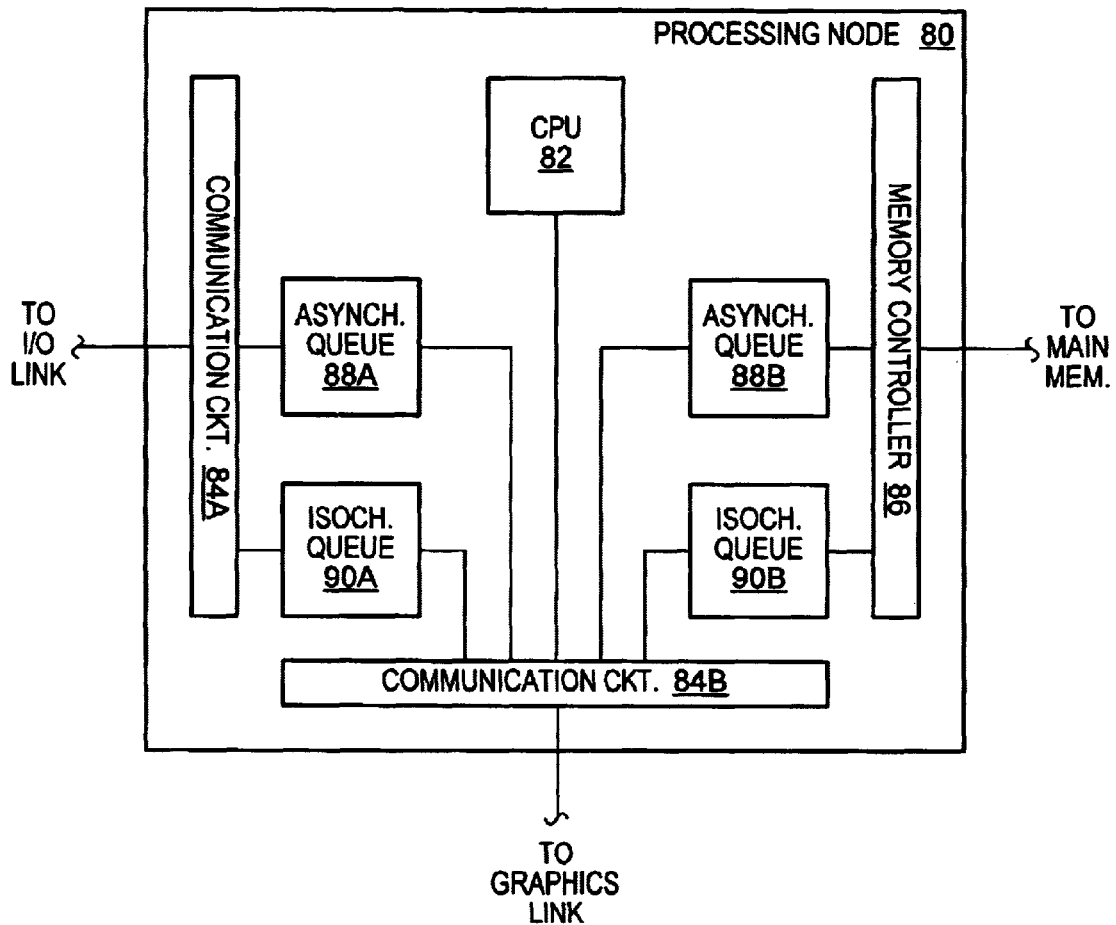
FIG. 10 is a block diagram of one embodiment of a processing node including several asynchronous and isochronous queues and arbiters which arbitrate between the asynchronous and isochronous queues for access to various data transport resources.

FIG. 10 is a block diagram of one embodiment of a processing node 80 including several asynchronous and isochronous queues and arbiters which arbitrate between the asynchronous and isochronous queues for access to various data transport resources. Processing node 80 includes a CPU 82 coupled to communications circuits 84A–84B and a memory controller 86. Communication circuit 84A is coupled to an input/output (I/O) communication link for conveying I/O information, and communication circuit 84B is coupled to a graphics communication link for conveying graphics information. Memory controller 86 is coupled to a main memory.

An asynchronous queue 88A is coupled between communication circuit 84A and communication circuit 84B. Communication circuits 84A and 84B store asynchronous commands (e.g., asynchronous data read and write commands) and/or asynchronous data values in asynchronous queue 88A. An isochronous queue 90A is coupled between communication circuit 84A and communication circuit 84B. Communication circuits 84A and 84B store isochronous commands (e.g., isochronous data read and write commands) and/or isochronous data values in asynchronous queue 90A.

Communication circuit 84A includes an arbiter (e.g., arbiter 48) which selects between asynchronous commands and/or data values in asynchronous queue 88A and isochronous commands and/or data values in isochronous queue 90A for access to the I/O link. Similarly, communication circuit 84B includes a first arbiter (e.g., arbiter 48) which selects between asynchronous commands and/or data values in asynchronous queue 88A and isochronous commands and/or data values in isochronous queue 90A for access to the graphics link.

An asynchronous queue 88B is coupled between communication circuit 84B and memory controller 86. Communication circuits 84B and memory controller 86 store asynchronous commands and/or data values in asynchronous queue 88B. An isochronous queue 90B is coupled between communication circuit 84B and memory controller 86. Communication circuits 84B and memory controller 86 store isochronous commands and/or data values in asynchronous queue 90B.

Communication circuit 84B includes a second arbiter (e.g., arbiter 48) which selects between asynchronous commands and/or data values in asynchronous queue 88B and isochronous commands and/or data values in isochronous queue 90B for access to the graphics link. Similarly, memory controller 86 includes an arbiter (e.g., arbiter 48) which selects between asynchronous commands and/or data values in asynchronous queue 88B and isochronous commands and/or data values in isochronous queue 90B for access to the main memory.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a data transport resource;
   an asynchronous queue for storing asynchronous data;
   an isochronous queue for storing isochronous data, wherein the isochronous queue comprises a data level range divided into a plurality of portions; and
   an arbiter coupled to the data transport resource, the asynchronous queue, and the isochronous queue, wherein the arbiter is configured to arbitrate between the asynchronous queue and the isochronous queue for access to the data transport resource dependent upon the portion of the data level range in which a level of data resides within the isochronous queue;
   wherein the data level range of the isochronous queue extends between a maximum value and a minimum value, and wherein an upper portion of the data level range includes the maximum value, and wherein a lower portion of the data level range includes the minimum value.

2. The computer system as recited in claim 1, wherein the arbiter comprises a set of arbitration rules, and wherein each arbitration rule states conditions used to determine whether data is provided from the isochronous queue or the asynchronous queue, and wherein the arbiter arbitrates between the asynchronous queue and the isochronous queue for access to the data transport resource by: (i) selecting an arbitration rule from the set of arbitration rules dependent upon the portion of the data level range in which the level of data resides within the isochronous queue, and (ii) applying the rule.

3. The computer system as recited in claim 1, wherein the arbiter selects a first rule from the set of arbitration rules when the level of data within the isochronous queue resides in the lower portion of the data level range, and wherein under the first rule the asynchronous queue receives priority over the isochronous queue for access to the data transport resource.

4. The computer system as recited in claim 3, wherein the arbiter selects a second rule from the set of arbitration rules when the level of data within the isochronous queue resides in the upper portion of the data level range, and wherein the isochronous queue receives increased consideration for access to the data transport resource under the second rule than under the first rule.

5. The computer system as recited in claim 1, wherein the arbiter is coupled to receive a signal indicating a need for isochronous data and configured to allow the isochronous queue access to the data transport resource in response to the signal.

6. The computer system as recited in claim 1, wherein the data transport resource is a bus or a memory controller.

7. The computer system as recited in claim 1, wherein the asynchronous queue is coupled to receive asynchronous data and configured to provide the asynchronous data in an order in which the asynchronous data is received.

8. The computer system as recited in claim 1, wherein the asynchronous data comprises memory read and write commands and associated data values.

9. The computer system as recited in claim 1, wherein the isochronous queue is coupled to receive isochronous data and configured to provide the isochronous data in an order in which the isochronous data is received.

10. The computer system as recited in claim 1, wherein the isochronous data comprises video data or audio data.

11. The computer system as recited in claim 1, wherein the isochronous queue comprises a plurality of memory locations operated in a first-in-first-out (FIFO) manner, and wherein the number of memory locations within the isochronous queue defines the data level range of the isochronous queue.

12. The computer system as recited in claim 11, wherein the isochronous queue further comprises a write pointer and a read pointer, and wherein the write pointer indicates the next available memory location for storing isochronous data, and wherein the read pointer indicates the next memory location containing unread isochronous data, and wherein the level of data within the isochronous queue is the number of memory locations between the write pointer and the read pointer.

13. A method for providing data, comprising;
   dividing a data level range of an isochronous queue into a plurality of portions;
   associating a single one of a plurality of arbitration rules with each portion of the data level range, wherein each arbitration rule states conditions used to determine whether data is provided from the isochronous queue or an asynchronous queue;
   determining a level of data within the isochronous queue;
   determining a target portion of the data level range in which the level of data resides; and
   applying the arbitration rule associated with the target portion of the data level range in order to provide data from either the isochronous queue or the asynchronous queue.

14. The method as recited in claim 13, wherein a different arbitration rule is associated with each portion of the data level range.

15. The method as recited in claim 13, wherein one of the arbitration rules is associated with more than one of the portions of the data level range.

16. A method for providing data, comprising:
   grouping a plurality of asynchronous queues to form an asynchronous group;
   grouping a plurality of isochronous queues to form an isochronous group;
   determining levels of data within the isochronous queues;
   selecting a target group from among the asynchronous and isochronous groups dependent upon the levels of data within the isochronous queues;
   selecting a data queue within the target group;
   providing data from the selected data queue;
   dividing a data level range of each of the isochronous queues into a plurality of portions; and
   associating a single one of a plurality of arbitration rules with each possible combination of the portions of the data level ranges of the isochronous queues, wherein each arbitration rule states conditions used to determine whether data is provided from the asynchronous group or the isochronous group.

17. The method as recited in claim 16, wherein a different arbitration rule is associated with each possible combination of the portions of the data level ranges of the isochronous queues.

18. The method as recited in claim 16, wherein one of the arbitration rules is associated with more than one of the possible combinations of the portions of the data level ranges of the isochronous queues.

19. The method as recited in claim 16, wherein the step of selecting a target group comprises:
   determining a target portion of the data level range of each of the isochronous queues in which the level of data resides; and applying the arbitration rule associated with the combination of the portions of the data level ranges including the target portions of the data level ranges in order to select a target group from among the asynchronous and isochronous groups.

20. A method for providing data, comprising:

grouping a plurality of asynchronous queues to form a asynchronous group;

grouping a plurality of isochronous queues to form a isochronous group;

dividing a data level range of each of the isochronous queues into a plurality of portions;

associating a single one of a plurality of arbitration rules with each possible combination of the portions of the data level ranges of the isochronous queues, wherein each arbitration rule states conditions used to determine whether data is provided from the asynchronous group or the isochronous group;

determining levels of data within each of the isochronous queues;

determining a target portion of the data level range of each of the isochronous queues in which the level of data resides; and applying the arbitration rule associated with the combination of the portions of the data level ranges including the target portions of the data level ranges in order to select a target group from among the asynchronous and isochronous groups;

selecting a data queue within the target group; and providing data from the selected data queue.

21. The method as recited in claim 20, wherein a different arbitration rule is associated with each possible combination of the portions of the data level ranges of the isochronous queues.

22. The method as recited in claim 20, wherein one of the arbitration rules is associated with more than one of the possible combinations of the portions of the data level ranges of the isochronous queues.

23. A computer system, comprising:

a data transport resource;

an asynchronous queue for storing asynchronous data;

an isochronous queue for storing isochronous data, wherein the isochronous queue comprises a data level range divided into a plurality of portions; and an arbiter coupled to the data transport resource, the asynchronous queue, and the isochronous queue, wherein the arbiter is configured to arbitrate between the asynchronous queue and the isochronous queue for access to the data transport resource dependent upon the portion of the data level range in which a level of data resides within the isochronous queue;

wherein the isochronous queue comprises a plurality of memory locations operated in a first-in-first-out (FIFO) manner, and wherein the number of memory locations within the isochronous queue defines the data level range of the isochronous queue; and wherein the isochronous queue further comprises a write pointer and a read pointer, and wherein the write pointer indicates the next available memory location for storing isochronous data, and wherein the read pointer indicates the next memory location containing unread isochronous data, and wherein the level of data within the isochronous queue is the number of memory locations between the write pointer and the read pointer.

* * * * *